United States Patent
Snape et al.

[11] Patent Number: 5,838,366
[45] Date of Patent: Nov. 17, 1998

[54] TRACKING APPARATUS FOR USE IN TRACKING AN OBJECT

[76] Inventors: Tim Snape, 4 Back St., Abbotsbury, Dorset DT3 4JP; Matthew Denner, 6 Station Road, Maiden Newton, Dorchester, Dorset DT2 0AE, both of United Kingdom

[21] Appl. No.: 742,511

[22] Filed: Nov. 1, 1996

[30] Foreign Application Priority Data

Nov. 3, 1995 [GB] United Kingdom ............... 9522596

[51] Int. Cl.⁶ .................................................. H04N 9/64
[52] U.S. Cl. ........................................ 348/170; 348/214
[58] Field of Search .................................. 348/169, 170, 348/579, 214; 235/469; H04N 9/64

[56] References Cited

U.S. PATENT DOCUMENTS

| | | | |
|---|---|---|---|
| 3,161,725 | 12/1964 | Hotham | 348/169 |
| 3,448,210 | 6/1969 | Clayton | 348/284 |
| 3,646,264 | 2/1972 | Waugh | 348/169 |
| 3,745,527 | 7/1973 | Yoshimura | 235/469 |
| 4,009,466 | 2/1977 | Clark | 235/469 |
| 5,426,289 | 6/1995 | Kinoshita | 235/469 |

FOREIGN PATENT DOCUMENTS

| | | |
|---|---|---|
| 0 439 334 A2 | 1/1991 | European Pat. Off. . |
| WO 93/15376 | 1/1993 | WIPO . |

*Primary Examiner*—Howard Britton
*Attorney, Agent, or Firm*—Iandiorio & Teska

[57] ABSTRACT

Tracking apparatus for use in tracking an object (4), which tracking apparatus comprises identification tag (2) which is for being attached to the object (4) and which comprises at least two colors (6,8) and a boundary (12) therebetween; a filter for filtering out colors except those colors on the identification tag (2); and a detector for detecting the boundary (12) on the identification tag (2) and thereby enabling the detected colors on the identification tag (2) to be identified from background colors (10) that may be the same as those on the identification tag (2).

8 Claims, 4 Drawing Sheets

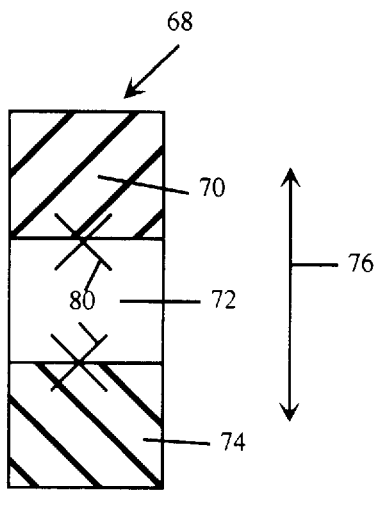
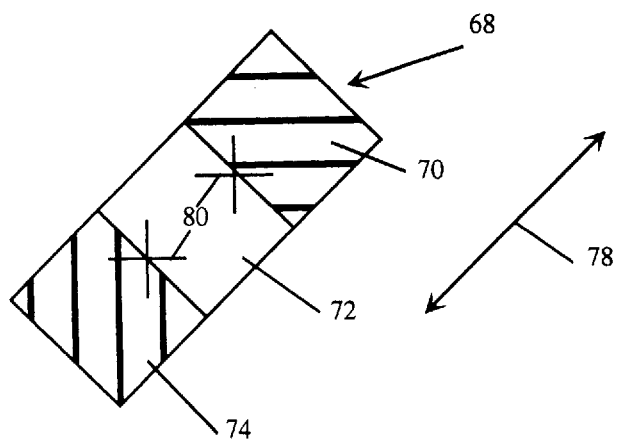
FIG 10  FIG 11
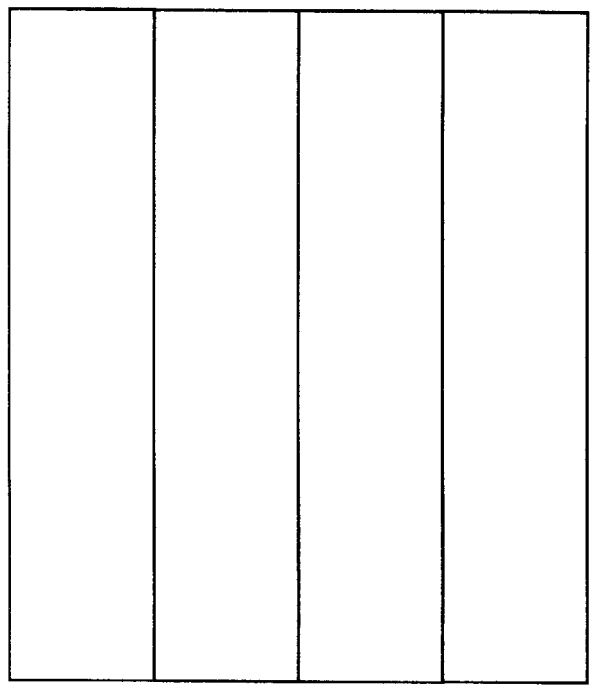
FIG 12

TRACKING APPARATUS FOR USE IN TRACKING AN OBJECT

This invention relates to tracking apparatus for use in tracking an object.

When an object is being filmed, difficulty often arises in getting a recording camera accurately to follow the object. There are many instances where the object moves too fast and/or in a random manner for the filming to be as good as is desired. Examples of such situations are where the object is a thrown discus, javelin or shot in athletics, where the object is a player in a team such for example as a football team or a basketball team, or where the object is a fast moving vehicle such for example as a helicopter or a car in a film stunt scene.

It is an aim of the present invention to reduce the above mentioned problem.

Accordingly, in one non-limiting embodiment of the present invention there is provided tracking apparatus for use in tracking an object, which tracking apparatus comprises identification means which is for being attached to the object and which comprises at least two colours and a boundary therebetween; filter means for filtering out colours except those colours on the identification means; and detector means which includes a chromatic edge filter and which is for detecting the boundary on the identification means and thereby enabling the detected colours on the identifications means to be identified from background colours that may be the same as those on the identification means.

The tracking apparatus of the present invention can be used for tracking a wide range of objects in a wide range of different applications. Thus, for example, the tracking apparatus may find use in the entertainments industry in the filming of athletics, motor racing, skiing, power boat racing, horse racing, football, basketball and hockey. Complicated stunt scenes being filmed can also be facilitated using the tracking apparatus of the present invention. Generally, if the filming apparatus is provided with the tracking apparatus of the present invention, then the filming apparatus and in particular a recording camera being used for filming an object will be more easily able to follow the object during the filming.

The tracking apparatus of the present invention may also be used in industrial applications. Thus, for example, the tracking apparatus may be employed to cause a remotely controlled vehicle to follow an object in the form of a path. In this case, the path will be provided with the identification means. The path will be stationary but it may curve from side to side so that tracking of the path is still needed. In other words, the tracking apparatus can be used to track a moving object, or to track a stationary object such for example as a path which can have a varying course.

The tracking apparatus can also be used for detecting the orientation of objects. For example, an electrical component may need inserting in a specific orientation and this orientation can be detected using the tracking apparatus of the present invention.

The tracking apparatus may also be used in general applications such for example as extended bar code applications.

The identification means may be a sheet device for attaching to the object. The sheet device may be flexible for being worn as, for example, in the case where the object is to be attached to the clothing of a person such for example as an athlete or a footballer. The sheet device may be rigid as, for example in the case where the sheet device is to be attached to an object such for example as a vehicle.

The identification means may include securing means for securing the identification means to the object. Any suitable and appropriate securing means may be employed and the specific type of securing means employed will depend upon the object to which the identification means is to be attached. Thus, for example, if the identification means is to be attached to the clothing of an athlete, then pins or Velcro (registered trade mark) may be employed. If the identification means is to be attached to a vehicle, then an adhesive may be employed.

The filter means may be any suitable and appropriate type of filter means. The filter means may be a digital filter means or an analog filter means. The filter means may act to enhance features in a sample of data by highlighting multiple colours and the boundaries between them. Digital filters may be programmed into a computer. Such digital filters may be supplied with a digital description of colours in a scene and then the digital filters may perform two operations of firstly removing colours that are outside the spectrums of interest, and secondly removing colours that are not lying adjacent a colour boundary. These operations may be performed separately or merged into one single operation. The resulting scene only contains colour information lying on a colour boundary and this information can be used to detect the presence of a target and/or identify the position of a target and/or the orientation of a target. As an alternative to using digital filters in software, analog filters may be used for one or both filtering steps. An analog filter may be used at the detector means. Edge detection may be implemented in software although it can be implemented in hardware.

Any suitable and appropriate type of detector means may be employed. The detector means may be an arrangement of one or more cameras that supplies a visual scene in a format useable by the filter means. The detector means may be a frame grabber board that accepts an incoming video signal and copies a representation of the video scene into a computer memory. This scene can the be operated on by the filter means. If desired, the filter means may be incorporated into the detector means, such that the video scene captured into the computer memory may already be pre-filtered with all the wrong colours removed.

The present invention also provides filming apparatus comprising a recording camera, display means for displaying a recording made by the recording camera, and the tracking apparatus of the invention, the tracking apparatus being such that it causes the recording camera to follow the movement of the identification means on the object and therefore the object. Any suitable and appropriate known type of recording camera and display means may be employed.

Embodiments of the invention will now be described solely by way of example and with reference to the accompanying drawings in which:

FIGS. 10 and 11 illustrate how the invention may be used for the orientation of a three-colour marker; and FIG. 12 shows how the invention may be used as an extended bar code.

Figure 1:
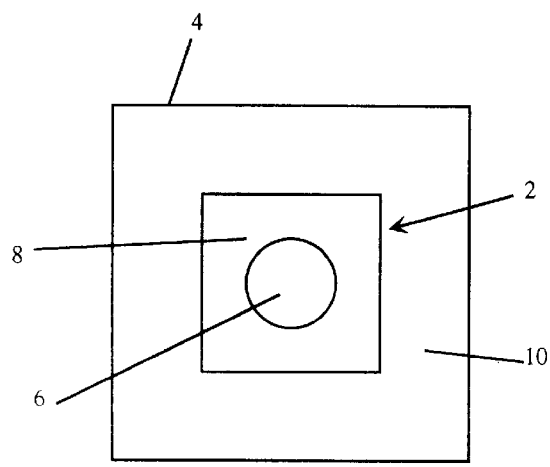
FIG. 1 shows identification means on an object having a multicoloured background.
Figure 2:
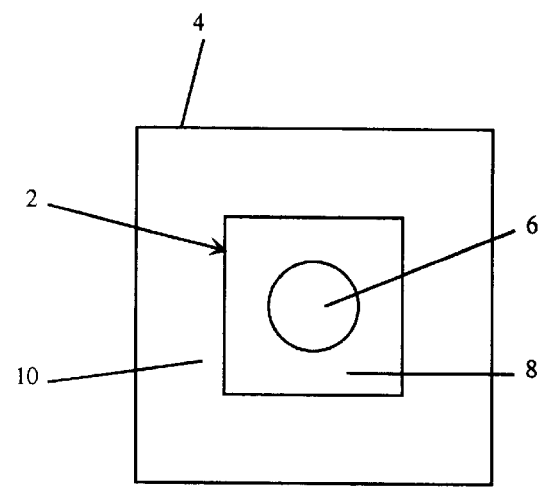
FIG. 2 shows the identification means of FIG. 1 with the multiple colours of the background removed.

Referring to FIGS. 1 and 2, there is shown identification means in the form of a tag 2 which has been attached to an object 4. The object 4 may be any one of a wide variety of objects including people and vehicles. If a recording camera views a scene with the object 4 in it, the entire scene will contain multiple colours. The recording camera will however have the tag 2 in view. By using filter means (not shown), all colours except the two colours on the tag 2 can be filtered out. This is shown in FIG. 2 where the object 4 now has a plain background.

As can be seen from FIGS. 1 and 2, the tag 2 has a first colour in a circle 6 and a second colour in a square 8. The precise colours are not relevant providing the two colours are different.

As thus far described, it would be possible for the object 4 to have a background 10 containing the same colours as those of the tag 2. In this case, it would not be possible for the recording camera to distinguish the tag 2 from the background as indicated for simplicity by the background 10 of the object 4.

Figure 3:
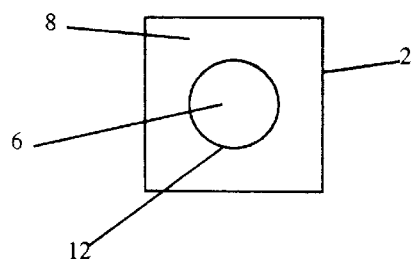
FIG. 3 shows the identification means of FIG. 1 on an enlarged scale.
Figure 4:
FIG. 4 shows the identifications means as identified just by a boundary between the two colours used to form the identification means.

FIGS. 3 and 4 illustrate how detector means (not shown) can be used to detect for a boundary 12 between the two colours in the circle 6 and the square 8. The boundary 12 is the colour boundary between the two colours. Once the boundary 12 has been located, the tag 2 can be identified. Thus the detector means enables the detected colours on the tag 2 to be identified from the background colours on the background 10 and this is required in case the background colours should be the same as those on the tag 2.

The filtration of the colours by the filtering means and the identification of the boundary 12 by the detector means can be effected in separate stages but they will normally be produced in a single stage in a single piece of apparatus. By careful selection of the colours used for the tag 2, it is possible to reduce the chance of false boundaries 12 being located due to the same colours being found on a background. Once the colours and the boundary 12 have been located, general techniques already present in image processing can be used to detect and predict the movement of the object. It will thus be seen that the tracking apparatus of the present invention can be used where an object can be marked. By marking the object, a large amount of complex computation can be eliminated so that the tracking apparatus of the present invention can be produced to be very cheap as compared with existing apparatus which requires complex computation. Essentially, the tracking apparatus removes all unwanted information and then tracks on the remaining data. A moving object is thus able to be located in a scene.

Figure 5:
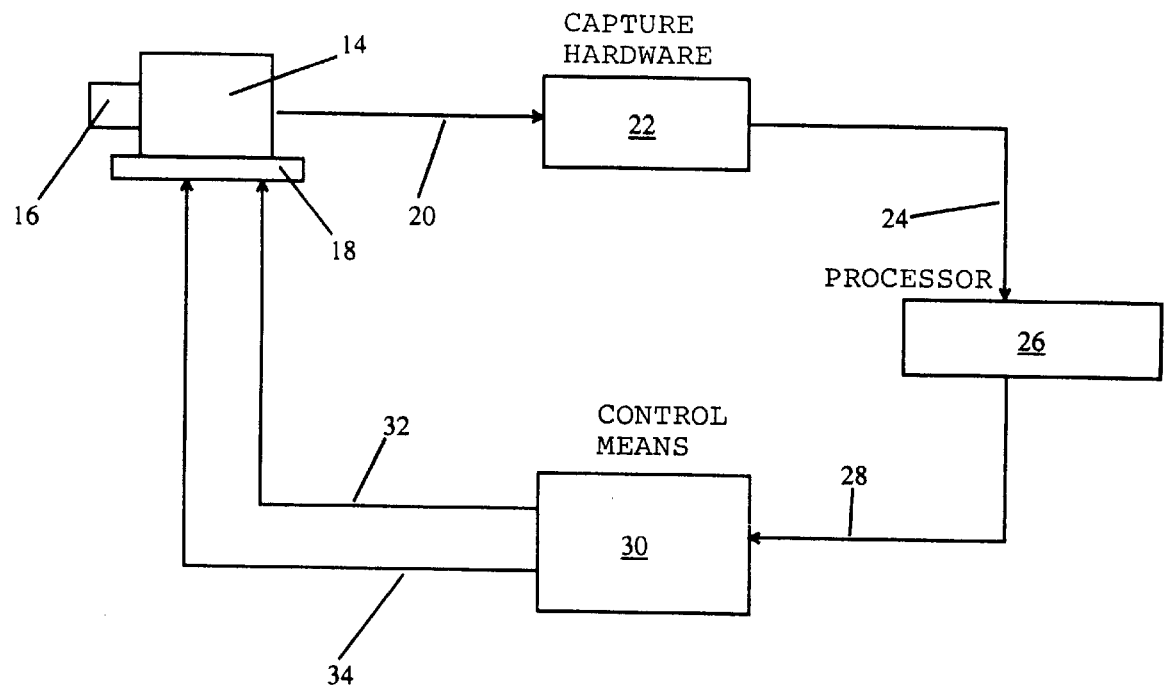
FIG. 5 shows filming apparatus utilizing tracking apparatus of the invention.

Referring now to FIG. 5, there is shown a recording camera 14 having a lens section 16. The camera 14 is mounted on a platform 18. The camera 14 records an image which is sent via line 20 to appropriate capture hardware 22. The capture hardware 22 produces digital image data which is sent along line 24 to a processor 26. The processor 26 acts as control means and it sends control data along line 28 to control means 30 for controlling movement of the platform 18 and thus the camera 14. More specifically, the control means 30 sends information causing the platform 18 to pan along line 32 and information causing the platform 18 to tilt along line 34. The information passing along lines 32, 34 will be used to control appropriate pan and tilt motors (not shown).

Figure 6:
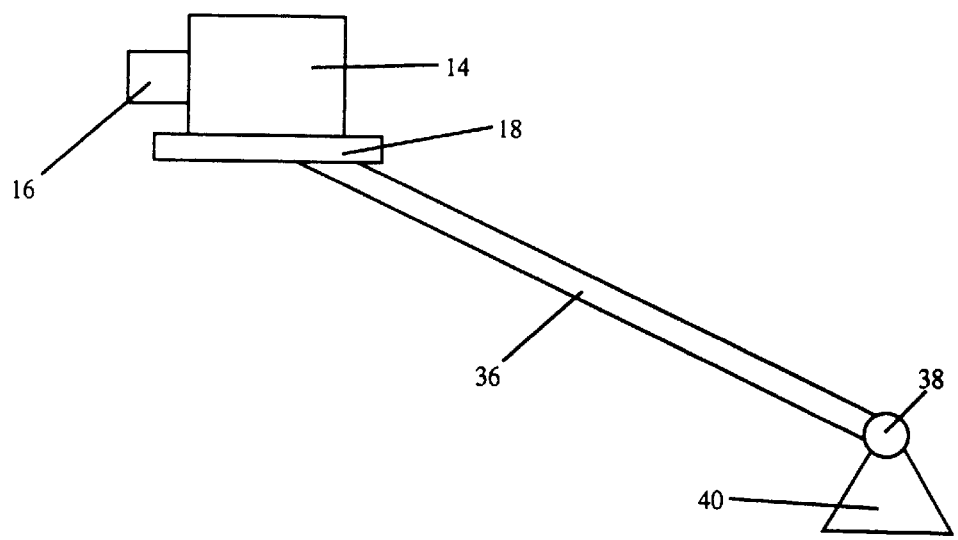
FIG. 6 illustrates how a recording camera shown in FIG. 2 can be physically moved.

FIG. 6 illustrates how the position of the camera 2 can be altered manually by a movable arm 36 pivotally mounted on a pivot 38 on a base 40.

The apparatus shown in FIGS. 5 and 6 may be designed for a personal computer based system using expansion boards to capture the image and control the camera orientation.

The apparatus shown in FIGS. 5 and 6 can be used in sporting events so that, for example, it will be possible to have cameras that follow the path of missile objects such for example as a discus or a javelin, by painting the objects with a distinct colour boundary. Also, events where athletes compete one at a time, for example the long jump or the triple jump, allow the system to be used due to the individual colours of teams that would probably be competing.

Track events that have a large number of athletes with two of more athletes from the same country would need to be further distinguished by appropriate identification means. Unique identification means may be attached to each competitor making a new colour boundary.

The apparatus shown in FIGS. 5 and 6 may further be used to film motor racing, skiing, power boat racing, horse racing, football, rugby, hockey and a wide variety of other sports. All that it is necessary to do is to provide a unique tag 2 for individual competitors.

Figure 7:
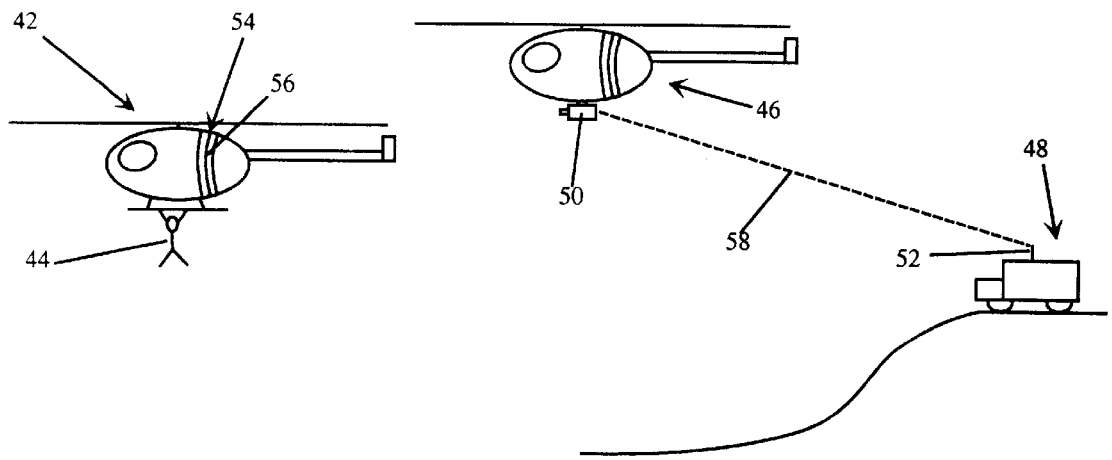
FIG. 7 illustrates how the apparatus of the invention may be used in filming a helicopter stunt.

Referring now to FIG. 7, there is shown an application of the invention in the stunt film industry. Referring to FIG. 7, there is shown a stunt helicopter 42 with a stunt man 44 hanging from the helicopter 42. In order to film the stuntman 44, a film helicopter 46 and a film van 48 are required. The film helicopter 46 has a recording camera 50 which sends signals to an antenna 52 on the film van 48. A camera crew of two or three people will normally be employed. If the stunt helicopter 42 is provided with identification means in the form of a two colour stripe 54 with a colour boundary 56 then the camera 50 can easily track the stunt helicopter 42. Better filming at reduced cost may thus be achieved. More accurate pictures will be obtained by the film helicopter 46 which can then be sent back to the antenna 52 via a radio link 58.

Figures 8, 9:
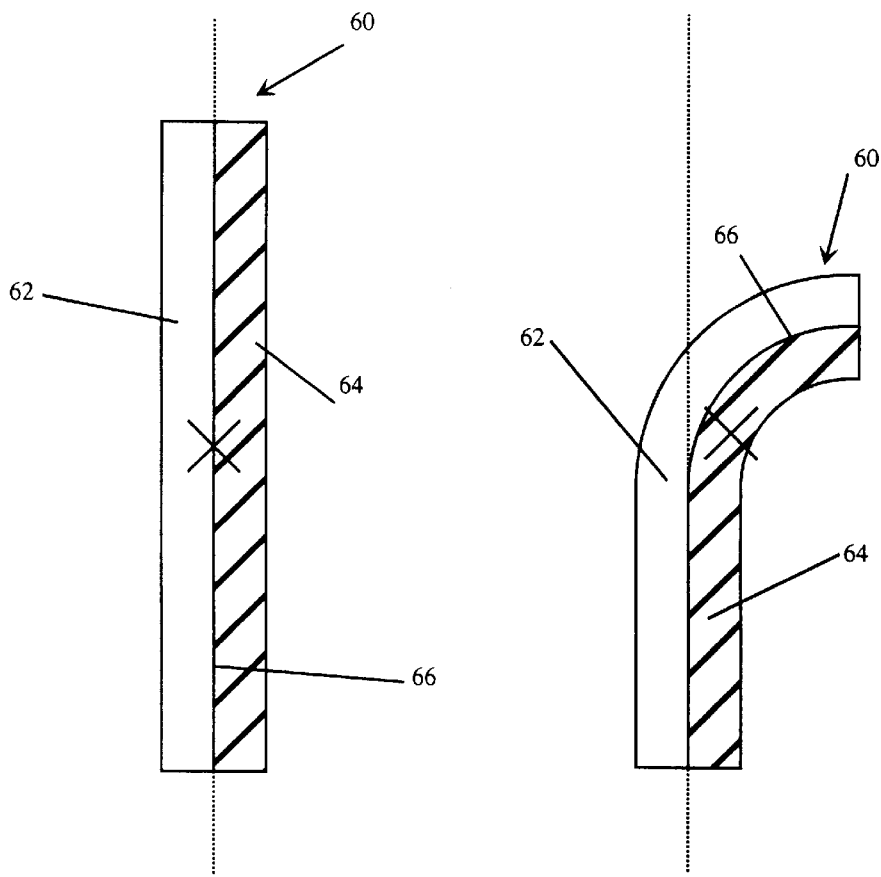
FIGS. 8 and 9 illustrate an application of the invention where a vehicle could be caused to follow a winding path, FIG. 8 illustrating a straight part of the path and FIG. 9 illustrating a curved part of the path.

Referring now to FIGS. 8 and 9, the invention may be used in industrial applications. Thus, for example, a small remote controlled vehicle (not shown) may be fitted with the invention, except that a camera would be employed which would point towards the ground in order to follow a painted winding path 60. The painted path 60 has a straight section as shown in FIG. 8 and a curved section as shown in FIG. 9. The painted path is formed of two different colours 62, 64 and these two different colours 62, 64 are separated by a colour boundary 66.

Providing the vehicle keeps moving forward, the tracking system attached to the vehicle will inform the vehicle of the direction to turn. For example, FIG. 8 shows the centre of the boundary 66 for the illustrated two colour straight path, whilst FIG. 9 shows the centre of the boundary for a bend in the illustrated two colour path. The vehicle is caused to turn to the right in order to follow the path as shown in FIG. 9 as the centre of the boundary has moved to the right, the centre of the boundary in FIGS. 8 and 9 being illustrated by a cross. The vehicle may be any suitable and appropriate type of vehicle, such for example as a vehicle carrying toxic waste from one point to another point.

The apparatus may also be used for the detection of the orientation of objects. In this case, the apparatus searches for two boundaries. For example, an electrical component may need inserting in a specific orientation. By inserting a three colour marker, for example consisting of three different rectangular blocks of colour, it is possible to detect the orientation of the electrical component. The orientation is bound by calculating the vector from one centre point to the other. This is illustrated in FIGS. 10 and 11 where identification means in the form of a tag 68 is shown. The tag 68 has three different colours 70, 72, 74 as illustrated. In FIG. 10, the orientation is vertical as shown by the arrow 76, whilst in FIG. 11 the orientation is at 45° as shown by the arrow 78. The centre of the colour boundaries are marked by the crosses 80.

The invention may also be used in bar code applications as shown by FIG. 12. More specifically, bar codes currently use black and white stripes to uniquely identify certain numbers. The invention may be used to create extended bar codes that could look like a grid of colours. By detecting certain colour boundaries and the vectors between their centres, it is possible to create an almost infinite number of unique bar codes. By adjusting the size of certain colour squares on the extended bar codes the boundaries would be moved and a new bar code created. With four differently coloured stripes as shown in FIG. 12, very many permutations of the four colours are available.

It will be appreciated from the above that the present invention can be used in applications having a high human risk, or requiring an interesting or new view on a scene, or where existing systems are too costly. The apparatus of the present invention is cheap and flexible. It is also to be appreciated that the embodiments of the invention described above with reference to the accompanying drawings have been given by way of example only and that modifications may be effected. Thus, for example, two, three or any suitable and appropriate desired number of colours separated by appropriate boundaries can be employed.

We claim:

1. Tracking apparatus for use in tracking an object, which tracking apparatus comprises identification means which is for being attached to the object and which comprises at least two colours and a boundary therebetween; filter means for filtering out colours except those colours on the identification means; and detector means which includes a chromatic edge filter and which is for detecting the boundary on the identification means and thereby enabling the detected colours on the identification means to be identified from background colours that may be the same as those on the identification means.

2. Tracking apparatus according to claim 1 in which the identification means is a sheet device for attaching to the object.

3. Tracking apparatus according to claim 2 in which the sheet device is flexible for being worn.

4. Tracking apparatus according to claim 2 in which the sheet device is rigid.

5. Tracking apparatus according to claim 1 in which the identification means includes securing means for securing the identification means to the object.

6. Tracking apparatus according to claim 1 in which the filter means is a digital filter means or an analog filter means.

7. Tracking apparatus according to claim 1 in which the detector means is an arrangement of one or more cameras that supplies a visual scene in a format useable by the filter means.

8. Filming apparatus comprising a recording camera, display means for displaying a recording made by the recording camera, and tracking apparatus, the tracking apparatus being such that it causes the recording camera to follow the movement of the identification means on the object and therefore the object, and the tracking apparatus being such that it comprises identification means which is for being attached to the object and which comprises at least two colours and a boundary therebetween; filter means for filtering out colours except those colours on the identification means; and detector means which includes a chromatic edge filter and which is for detecting the boundary on the identification means and thereby enabling the detected colours on the identification means to be identified from background colours that may be the same as those on the identification means.

* * * * *